(12) United States Patent
Cook et al.

(10) Patent No.: US 9,166,878 B1
(45) Date of Patent: Oct. 20, 2015

(54) NETWORK MANAGEMENT CONFIGURATION FOR RETRIEVING AND AGGREGATING STATUS INFORMATION FROM RESOURCES DISTRIBUTED ACROSS A NETWORK

(75) Inventors: Dana Cook, Deerfield, NH (US); Chris Cole, Topsfield, MA (US); David Nedde, Andover, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 101 days.

(21) Appl. No.: 12/977,585

(22) Filed: Dec. 23, 2010

(51) Int. Cl.
*G06F 15/173* (2006.01)
*H04L 12/24* (2006.01)

(52) U.S. Cl.
CPC ............ *H04L 41/08* (2013.01); *H04L 41/0803* (2013.01)

(58) Field of Classification Search
CPC ............... H04L 41/08; H04L 41/0803; H04L 29/08072; H04L 29/06; H04L 29/0809
See application file for complete search history.

(56) References Cited

U.S. PATENT DOCUMENTS

| | | | |
|---|---|---|---|
| 8,228,930 B1* | 7/2012 | Kim et al. | 370/413 |
| 2002/0198974 A1* | 12/2002 | Shafer | 709/223 |
| 2004/0039820 A1* | 2/2004 | Colby et al. | 709/226 |
| 2004/0076151 A1* | 4/2004 | Fant et al. | 370/389 |
| 2005/0193114 A1* | 9/2005 | Colby et al. | 709/226 |
| 2005/0267959 A1* | 12/2005 | Monga et al. | 709/223 |
| 2006/0018318 A1* | 1/2006 | Rinne et al. | 370/389 |
| 2010/0169467 A1* | 7/2010 | Shukla et al. | 709/220 |

* cited by examiner

*Primary Examiner* — Dhairya A Patel
(74) *Attorney, Agent, or Firm* — Cooley LLP (57) ABSTRACT

In one embodiment, an apparatus includes a network management module configured to execute at a network device operatively coupled to a switch fabric. The switch fabric may have a distributed control plane. The network management module is configured to receive a request regarding status information for a certain set of network resources identified with a virtual or logical identifier. The network management module is configured to generate and send a corresponding query for status information to a set of physical elements that encompass and may be larger than the certain set of network resources and collect responses to that query. The network management module is configured to construct a response to the request from the status information in the collected responses to the query. The constructed response includes only information related to the original request.

17 Claims, 4 Drawing Sheets

NETWORK MANAGEMENT CONFIGURATION FOR RETRIEVING AND AGGREGATING STATUS INFORMATION FROM RESOURCES DISTRIBUTED ACROSS A NETWORK

BACKGROUND

Some embodiments described herein relate generally to organization of network resources, and more particularly to arrangements for collecting and aggregating status information for logically-associated resources distributed across a network.

Known network fabric systems often include one or more peripheral processing devices, access switches, multi-stage switch fabrics, or other hardware and/or software resources. Many such network fabric systems allocate network resources to multiple entities where a given individual or entity has assigned to it one or more logical collections of network resources, each logical collection including multiple resources distributed across the network fabric. These logical collections can include multiple access switches, multiple peripheral devices, virtual local area networks or various combinations or subcombinations of the same. The need exists for methods and apparatus to collect information, such as status information, either individually, or collectively, about each network resource allocated to a given individual or entity irrespective of the actual distribution across the switch fabric system of the physical resources associated with or allocated to that individual or entity.

SUMMARY

In one embodiment, an apparatus includes a network management module configured to execute at a network device operatively coupled to a switch fabric. The network management module is configured to receive a first set of configuration information associated with a subset of network resources from a set of network resources, the subset of network resources being included in a virtual local area network from a set of virtual local area networks, the set of virtual local area networks being defined within the switch fabric. The network management module is configured to receive a request for information regarding network resources associated with a first logical entity. The network management module is further configured to then identify physical resources that are to receive a status inquiry. Upon receiving responses to the status inquiry, the network management module is configured to aggregate status information particular to the network resources associated with the received request.

DETAILED DESCRIPTION

In some embodiments, a switch fabric system can include multiple Virtual Data Center Fabrics (VDCFs), Virtual Local Area Networks (VLANs) and/or resource groups. A VDCF can include a portion of the switch fabric system that operates as a single, autonomous data center fabric. A resource group can include, for example, one or more network resources included in the switch fabric system. Each resource group can optionally be of the same scope and/or include substantially the same network resources as one or more VLANs in the switch fabric system. The one or more network resources can be, for example, one or more peripheral processing devices, access switches, compute nodes, physical ports, network control entities (NCEs), etc. In some embodiments, each resource group can be associated with a particular lessor (e.g., end user or customer) of a portion of the switch fabric system. A given lessor can have multiple resource groups associated therewith, in logical arrangements defined by the lessor, the network administrator/provider of the data center fabric, or both.

In some embodiments, each of one or more network resources of the switch fabric system can be associated with a configuration file. Each such configuration file can include, for example, identifier/name, logical and/or physical address, port assignment, peripheral processing device information, network portion assignment and/or other configuration information associated with the network resource with which that configuration file is associated. In some embodiments, each configuration file can include network topology information and/or hierarchy information defined consistent with the actual topology and/or hierarchy of physical and/or virtual resources in the switch fabric system. In addition, in some embodiments each of the network resources is capable of tracking, and, upon request, reporting, status information, which can include by way of example interface information, packet count information and the like.

In some embodiments, each configuration file for a given network grouping or resource defined at a given hierarchical level of the switch fabric system can include configuration information and/or a configuration file associated with one or more network resources included at a lower hierarchical level of the switch fabric system. For example, a configuration file associated with a resource group can include configuration information associated with that resource group and configuration information associated with each network resource included in that resource group. In another example, a configuration file associated with a VLAN or VDCF can include configuration information associated with that VLAN or VDCF, configuration information associated with one or more resource groups included in that VLAN or VDCF and configuration information associated with each network resource included in the one or more resource groups. The hierarchical arrangement facilitates a distributed control plane arrangement. The control information for various data plane resources can be distributed across the switch fabric.

In some embodiments, a network management module included in a compute node of the switch fabric system can receive a request for status information from a given lessor, or a representative of a lessor, relating to some or all of network resources associated with the lessor. The network management module can optionally determine whether the requester submitting the request is authorized, based on predetermined system permissions, to make such a request and/or to receive the information requested. If the network management module does make such a determination or if such a request is otherwise permissible without need of prior authorization determination, the network management module initiates a process for querying a set of network resources that encompasses the network resources associated with the received request.

In some embodiments, the received request refers to a collection of network resources using one or more logical or virtual identifiers. The network management module can use the one or more logical virtual identifiers to determine one or more physical identifiers for identifying specific network elements corresponding to the collection of network resources referred to in the request. The network management module can be configured to use physical identifier information, in whole or in part, to send the query to at least the identified specific network elements. The network management module can be configured to receive status information from each network element to which the query is directed. The network management module can parse or sort through received status information and construct a response to the request for transmission to the requester or a designee of the requester and/or to an alternative authorized party or entity.

In some embodiments, the received status information can include status information about one or more network resources that are not included in the collection of resources associated with the request. The network management module can exclude status information from such one or more network resources in constructing the response to the request.

Figure 1:
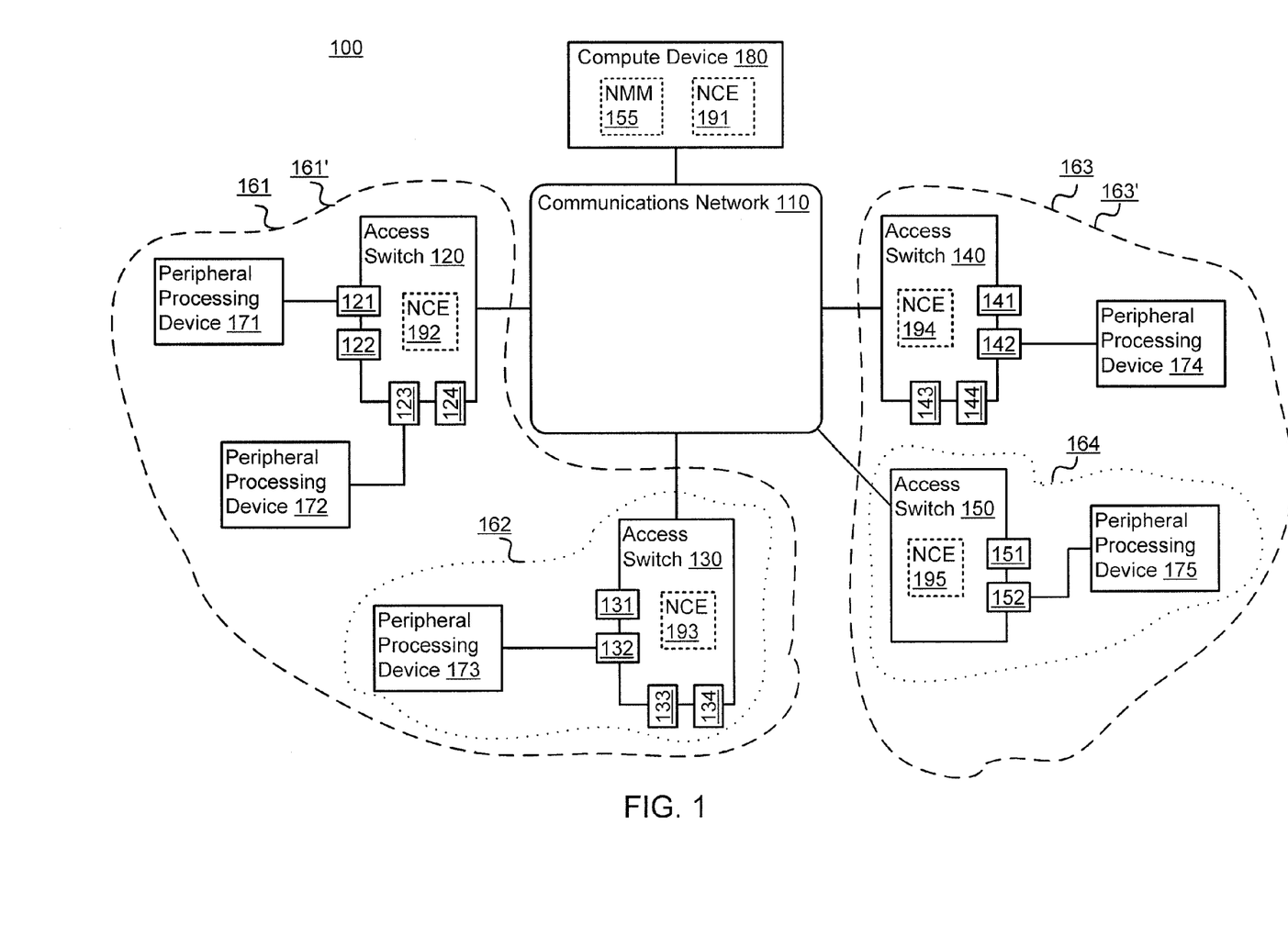
FIG. 1 is a schematic illustration of a switch fabric system that includes multiple resources, according to an embodiment.

FIG. 1 is a schematic illustration of a switch fabric system that includes multiple VLANs and resource groups, according to an embodiment. More specifically, FIG. 1 illustrates a Switch Fabric System 100 that includes a Communications Network 110 physically and/or operatively coupled to a Compute Device 180 and Access Switches 120, 130, 140 and 150. The Access Switch 120 is physically and/or operatively coupled to Peripheral Processing Devices 171 and 172, the Access Switch 130 is physically and/or operatively coupled to a Peripheral Processing Device 173, the Access Switch 140 is physically and/or operatively coupled to a Peripheral Processing Device 174 and the Access Switch 150 is physically and/or operatively coupled to the Peripheral Processing Device 175. The Compute Device 180 includes a Network Management Module ("NMM") 155 and a Network Control Entity ("NCE") 191. The Access Switches 120, 130, 140 and 150 include NCEs 192-195, and Physical Ports 121-124, 131-134, 141-144 and 151-152, respectively. The Physical Port 121 is coupled to the Peripheral Processing Device 171, the Physical Port 123 is coupled to the Peripheral Processing Device 172, the Physical Port 132 is coupled to the Peripheral Processing Device 173, the Physical Port 142 is coupled to the Peripheral Processing Device 174 and the Physical Port 152 is coupled to the Peripheral Processing Device 175. The NCE 192 is associated with the Physical Ports 121-124, the NCE 193 is associated with the Physical Ports 131-134, the NCE 194 is associated with the Physical Ports 141-144 and the NCE 195 is associated with the Physical Ports 151-152.

The Communications Network 110 can be any combination of hardware and/or software (executing on hardware) configured to transmit data between any of the Peripheral Processing Devices 171-175 and/or any of the Access Switches 120, 130, 140 and 150. In some embodiments, the Communications Network 110 can be a switch fabric, such as a multi-stage switch fabric. The Communications Network 110 can optionally transmit data based at least in part on the Ethernet, Fibre Channel, FCoE, and/or another network protocol (such as cell-based network transmission). Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety. In some embodiments, the Communications Network 110 can include one or more hardware devices configured to exchange data according to one or more of the above-enumerated network protocols. Additional details related to communications networks such as switch fabrics and multi-stage switch fabrics are disclosed in U.S. patent application Ser. No. 12/558,130 entitled "Methods and Apparatus Related to a Low Cost Data Center Architecture," filed Sep. 11, 2009, which is incorporated herein by reference in its entirety.

Each of the Access Switches 120, 130, 140 and 150 can be any combination of hardware and/or software (executing in hardware) situated at the edges of the Communications Network 110. As shown in FIG. 1, the Access Switch 120, 130, 140, 150 and 150 can function as gateways to one or more peripheral processing devices coupled thereto. As also shown in FIG. 1, each of the Access Switches 120, 130, 140 and 150 can host one or more NCEs (described below), such as the NCE 192 hosted at the Access Switch 120, the NCE 193 hosted at the Access Switch 130, the NCE 194 hosted at the Access Switch 140 and the NCE 195 hosted at the Access Switch 150.

In some embodiments, each of the Access Switches 120, 130, 140 and 150 can be physically located within a chassis of the Switch Fabric System 100. In some embodiments, for example, each Access Switch 120, 130, 140 and 150 can be located within the same chassis. In other embodiments, each Access Switch 120, 130, 140 and 150 can be located within a different chassis. Structurally, the Access Switches 120, 130, 140 and 150 can function as both source access switches and destination access switches. Accordingly, the Access Switches 120, 130, 140 and 150 can send data (e.g., a data stream of data frames, packets and/or data cells) to and receive data from a data plane portion of the Communications Network 110, and to and from the respective connected Peripheral Processing Devices 171-175. Each of the Access Switches 120, 130, 140 and 150 can optionally be referred to as an edge device and/or a top-of-the-rack "TOR" device.

As shown in FIG. 1, each of the Access Switches 120, 130, 140 and 150 is configured to communicate with the other Access Switches 120, 130, 140 and 150 via a data plane portion of the Communications Network 110. Specifically, the data plane portion of the Communications Network 110 is configured to provide any-to-any connectivity between the Access Switches 120, 130, 140 and 150 at relatively low latency. For example, the data plane portion of the Communications Network 110 can be configured to transmit (e.g., convey) data between Access Switches 120, 130, 140 and 150. In some embodiments, the Communications Network 110 can have at least hundreds or thousands of ports (e.g., egress ports and/or ingress ports) through which Access Switches 120, 130, 140 and 150 can transmit and/or receive data. Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety.

As discussed in further detail herein, the Access Switches 120, 130, 140 and 150 can be configured to host one or more network control entities (NCEs) to manage the Physical Ports 121-124, 131-134, 141-144 and 151-152 of the Access Switches 120, 130, 140 and 150, respectively. For example, the Access Switch 120 can host the NCE 192 to manage the Physical Ports 121-124 and 131-132, and the Access Switch 140 can host the NCE 194 to manage the Physical Ports 141-143 and 152. The Compute Device 180 can also optionally host one or more NCEs to manage one or more of the Physical Ports 121-124, 131-134, 141-144 and 151-152. For example, the Compute Device 180 can host the NCE 191 to manage the Physical Ports 133 and 151. The NCEs 191-195 can each be processes, applications, virtual machines and/or some other software module (executing in hardware) or a hardware module that is executed at the Compute Device 180, the Access Switch 120, the Access Switch 130, the Access Switch 140 and the Access Switch 150, respectively. In some embodiments, the NCEs 191-195 and/or the NMM 155 can be considered a part of a control plane of the Switch Fabric System 100.

In some embodiments, each of the NCEs 191-195 can be defined and/or spawned by a controlling entity or module, such as the NMM 155 hosted at the Compute Device 180. The Compute Device 180 can provision one or more new NCEs based on a current amount of host protocol-based traffic and/or other load-balancing or other network management factors. Each of the NCEs 191-195 can optionally be configured to receive and respond to one or more host protocol requests, such as one or more dynamic host configuration protocol (DHCP), address resolution protocol (ARP), reverse address resolution protocol (RARP), interest group management protocol (IGMP) or other host protocol requests. In some embodiments, each of the NCEs 191-195 can be associated with one or more tables or data records (not shown in FIG. 1) storing address information for one or more devices included in the Switch Fabric System 100, such as an internes protocol (IP) and/or media address control (MAC) address of one or more of the Access Switches 120, 130, 140 and 150 and/or one or more of the Peripheral Processing Devices 171-175.

Each of the Physical Ports 121-124, 131-134, 141-144 and 151-152 can be, for example, a physical communication port, such as an Ethernet port, a Fibre Channel over Ethernet ("FCoE") port, a Fibre Channel port, a coaxial cable port, or other physical communication port. In some embodiments, one or more of the physical ports enumerated above can be physically coupled to one or more peripheral processing devices to enable exchange of data therewith.

The Compute Device 180 is any combination of hardware and/or software (executing on hardware) configured to perform one or more network management tasks. In some embodiments, the Compute Device 180 can be a server device. The Compute Device 180 can be physically and/or operatively coupled to the Communications Network 110 via, for example, a wired and/or wireless Ethernet, Fibre Channel or other physical and/or logical connection. As shown in FIG. 1, the Compute Device 180 includes and/or hosts the NMM 155 and the NCE 191.

Each of the Peripheral Processing Devices 171-175 are any combination of hardware and/or software (executing on hardware) capable of transmitting and/or receiving information across the Communications Network 110 via an access switch. In some embodiments, one or more of the above-enumerated peripheral processing devices can be a server device, an application server, a database system, a storage device, a gateway, a workstation, a compute device and/or the like. Each of the Peripheral Processing Devices 171-175 can optionally be, for example, compute nodes, service nodes, routers, and storage nodes, as described in further detail herein. In some embodiments, one or more of the Peripheral Processing Devices 171-175 can perform one or more computing tasks, such as one or more data storage, Software as a Service (SAS), web service, content request, or other computing tasks.

The Peripheral Processing Devices 171-175 can be in communication with and/or operatively coupled to one or more Physical Ports 121-124, 131-134, 141-144, 151-152 of the Access Switches 120, 130, 140 and 150, respectively, using any suitable connection such as, for example, an optical connection (e.g., an optical cable and optical connectors), an electrical connection (e.g., an electrical cable and electrical connectors) and/or the like. Similarly stated, each of the Physical Ports 121-124, 131-134, 141-144, 151-152 can provide a communication interface through which a Peripheral Processing Device 171-175 can be operatively coupled to an Access Switch 120, 130, 140, 150, as described in further detail herein. As such, the Peripheral Processing Devices 171-175 are configured to send data (e.g., data frames, data packets, data cells, etc.) to and receive data from the Access Switches 120, 130, 140 and 150. In some embodiments, each connection between the Peripheral Processing Devices 171-175 and the respective access switches 120, 130, 140 and 150 is a direct link. In other embodiments, the Peripheral Processing Devices 171-175 can be operatively coupled to the Access Switches 120, 130, 140 and 150 via intermediate modules.

The NMM 155 is any combination of hardware and/or software (executing on hardware) configured to manage the provisioning, allocation and/or configuration of network resources in the Switch Fabric System 100. For example, the NMM 155 can manage the definition, initiation, instantiation and/or destruction of one more NCEs hosted at, for example, a compute device (such as the Compute Device 180) and/or an access switch (such as any of the Access Switches 120, 130, 140 and 150). In some embodiments, the NMM 155 can receive and respond to one or more DHCP requests originating at a peripheral processing device coupled to an access switch, such as any of the Peripheral Processing Devices 171-175 coupled to any of the Access Switches 120, 130, 140 and 150. In some embodiments, the NMM 155 can receive, update, and transmit configuration information associated with one or more network resources included in the Switch Fabric System 100. For example, the NMM 155 can send and/or receive one or more signals including updated configuration information to and/or from the NCEs 191-195 for use thereby.

In some embodiments, the NMM 155 can also define one or more virtual local area networks (VLANs) within the Switch Fabric System 100. In such embodiments, a VLAN can comprise and/or be defined by any valid combination of network resources, such as one or more peripheral processing devices and one or more access switches, each of the one or more access switches within the VLAN being in communication with at least one of the one or more peripheral processing devices via one or more physical ports of that access switch. As shown in FIG. 1, the NMM 155 defines a VLAN 161' comprising the Access Switch 120, the Access Switch 130, the Peripheral Processing Devices 171-173, the Physical Ports 121-124 and 131-134 and the NCEs 192 and 193. As also shown in FIG. 1, the NMM defines a VLAN 163' comprising the Access Switch 140, the Access Switch 150, the Peripheral Processing Devices 174-175, the Physical Ports 141-144 and 151-152 and the NCEs 194 and 195. In some embodiments, the VLAN 161' and/or the VLAN 163' can optionally be a VDCF configured to operate as an autonomous data center fabric.

In some embodiments, the NMM 155 can also define one or more resource groups within the Switch Fabric System 100. In such embodiments, a resource group can comprise and/or be defined by any valid combination of network resources, such as one or more peripheral processing devices, access switches, route reflectors, routing engines and/or physical ports (also known as interfaces). In some embodiments, network resources included in a particular VLAN can likewise be included in a particular resource group. In such embodiments, each network resource included in the resource group can be identified by a prepended identifier portion based on an identifier of the VLAN. In this manner, each network resource included in the resource group can be uniquely identified by the Switch Fabric System 100. In some embodiments, the VLAN identifier can be based on a globally unique layer-2 identifier associated with the VLAN. In some embodiments, each resource group can be associated with an entity or individual (e.g., end user or customer) that leases or is associated with a portion of the network resources included in the Switch Fabric System 100. In this case, the resource group associated with that entity or individual can comprise the network resources leased by or associated with the entity or individual.

An entity or individual (e.g., end user or customer) can have associated therewith a collection of network resources. The network resources can, from the perspective of the entity or individual, be associated with each other as one or more resource groups and/or one or more virtual local area networks or both. These one or more network resource groups and/or one or more virtual local area networks can be associated with one or more virtual or logical identifiers. The network management module can be configured to correlate or identify a correspondence between the virtual or logical identifiers for an entity or individual and assigned or configured physical resources. In some instances the Network Management Module 155 either retains, or stores in corresponding memory, information that associates one or more virtual or logical identifiers and one or more physical identifiers. The Network Management Module 155 can dynamically adjust, change, modify or redefine associations between virtual or logical identifiers. The dynamic nature of such associations allows for changes to allocations of particular network elements and/or devices to satisfy or correspond to the network resources, the network resource groups and/or the virtual local area networks attributed to an entity or individual (e.g., end user or customer).

As shown in FIG. 1, the NMM 155 defines a Resource Group 161 that includes the same network resources included in the VLAN 161'. The NMM 155 also defines a Resource Group 162 that includes a subset of the network resources included in the VLAN 161', namely the Access Switch 130, the Peripheral Processing Device 173, the Physical Ports 131-134 and the NCE 193. As also shown in FIG. 1, the NMM 155 defines a Resource Group 163 that includes the same network resources included in the VLAN 163'. The NMM 155 also defines a Resource Group 164 that includes a subset of the network resources included in the VLAN 163', namely the Access Switch 150, the Peripheral Processing Device 175, the Physical Ports 151 and 152 and the NCE 195.

Although not shown in FIG. 1, in some embodiments, one of the Peripheral Processing Devices 171-175 can send one or more data packets and/or frames to another of the Peripheral Processing Devices 171-175 via one of the Access Switches 120, 130, 140 and 150 and the Communications Network 110. For example, the Peripheral Processing Device 173 can send a data frame to the Peripheral Processing Device 175 via the Access Switch 130, the Communications Network 110 and the Access Switch 150. The Peripheral Processing Device 173 can format and/or send the data frame in accordance with one or more configuration settings associated with the Resource Group 161 and the Resource Group 162 (of which the Peripheral Processing Device 173 is a member). The Peripheral Processing Device 173 can optionally send a second data frame to the Peripheral Processing Device 175 via the Access Switch 130, the Communications Network 110 and the Access Switch 150. In some embodiments, the Peripheral Processing Device 173 can format and/or send the second data frame in accordance with one or more updated configuration settings associated with the Resource Group 161. In such embodiments, the updated configuration settings associated with the Resource Group 161 can be applied to and/or inherited by a set of configuration settings associated with the Resource Group 162, and thus by each network resource included in the Resource Group 162 (e.g., the Peripheral Processing Device 173). In such embodiments, network elements or network resources can include a capability or capacity to track or monitor status information such as, but not limited to, interface count, data packet count or flow, etc.

Figure 2:
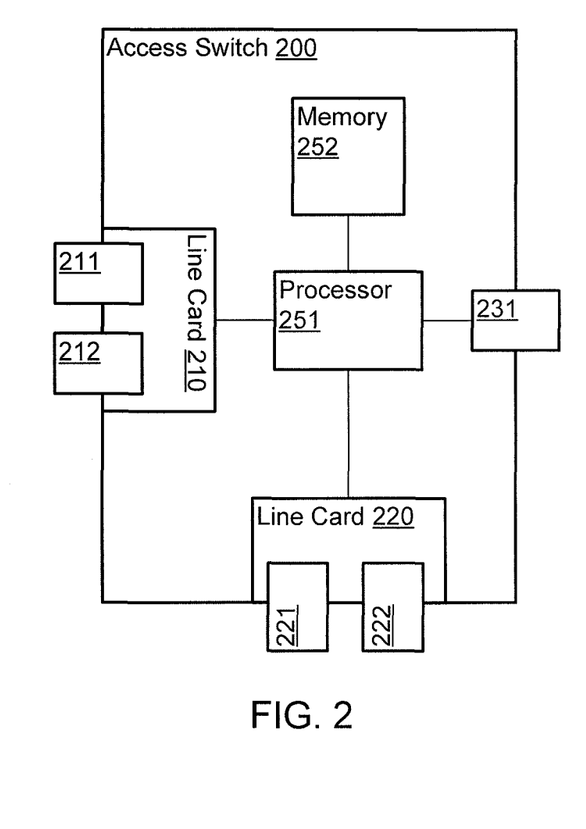
FIG. 2 is a schematic illustration of an access switch of a switch fabric system, according to another embodiment.

FIG. 2 is a schematic illustration of an access switch of a switch fabric system, according to another embodiment. More specifically, FIG. 2 is a system block diagram of an Access Switch 200, similar to the Access Switches 120, 130, 140 and 150 described in connection with FIG. 1 above. The Access Switch 200 includes a Processor 251, a Memory 252, a Line Card 210, a Line Card 220, and a Physical Port 231. The Processor 251 is operatively coupled to the Memory 252, the Line Card 210, the Line Card 220 and the Physical Port 231. The Line Card 210 includes the Physical Ports 211 and 212. The Line Card 220 includes the Physical Ports 221 and 222. In some embodiments, the Line Cards 210 and/or 220 include one or more processors and/or memories (not shown).

Similar to the Physical Ports 121-124, 131-134, 141-144 and 151-152 of the Access Switches 120, 130, 140, 150 (shown in FIG. 1), the Physical Ports 211, 212, 221 and 222 can be configured to communicate with peripheral processing devices. For example, the Physical Ports 211, 212, 221 and 222 can implement a physical layer using twisted-pair electrical signaling via electrical cables or fiber-optic signaling via fiber-optic cables. In some embodiments, some of the Physical Ports 211, 212, 221 and 222 can implement one physical layer such as twisted-pair electrical signaling, and others of the Physical Ports 211, 212, 221 and 222 can implement a different physical layer, such as fiber-optic signaling. Furthermore, the Physical Ports 211, 212, 221 and 222 can be configured to allow the Access Switch 200 to communicate with peripheral processing devices, such as, for example, computer servers (servers), via a common protocol such as Ethernet or Fibre Channel. In some embodiments, some of the Physical Ports 211, 212, 221 and 222 can implement one protocol such as Ethernet and others of the Physical Ports 211, 212, 221 and 222 can implement a different protocol such as Fibre Channel. Thus, the Access Switch 200 can be in communication with multiple peripheral processing devices using homogeneous or heterogeneous physical layers and/or protocols via the Physical Ports 211, 212, 221 and 222.

The Physical Port 231 can be configured to be in communication with other access switches via a communications network such as a switch fabric (e.g., the Communications Network 110). The Physical Port 231 can be part of one or more network interface devices (e.g., a 40 Gigabit (Gb) Ethernet interface, a 100 Gb Ethernet interface, etc.) through which the Access Switch 200 can send signals to and/or receive signals from a communications network. The signals can be sent to and/or received from the communications network via an electrical link, an optical link and/or a wireless link operatively coupled to the Access Switch 200. In some embodiments, the Access Switch 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, the Physical Port 231 can implement a different physical layer and/or protocol than those implemented at the Physical Ports 211, 212, 221 and 222. For example, the Physical Port 211, 212, 221 and 222 can be configured to communicate with peripheral processing devices using a data link layer protocol based on data packets and the Physical Port 231 can be configured to communicate via a switch fabric using a data link layer protocol based on data cells. Said differently, the Access Switch 200 can be an edge device of a network switch such as a distributed network switch.

In some embodiments, the Access Switch 200 can be configured to prepare a data packet (e.g., an Ethernet frame and/or packet) to enter a data plane portion of a communications network (e.g., the Communications Network 110). For example, the Access Switch 200 can be configured to forward, classify, and/or modify the packet encapsulation (e.g., modify, add and/or remove a header portion, footer portion and/or any other identifier included within the data packet) of a data packet prior to sending the data packet to the data plane of the communications network. Additionally, the Access Switch 200 can be configured to partition and/or divide the data packet into data cells (e.g., having fixed length payloads) prior to sending the data cells to the data plane of the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
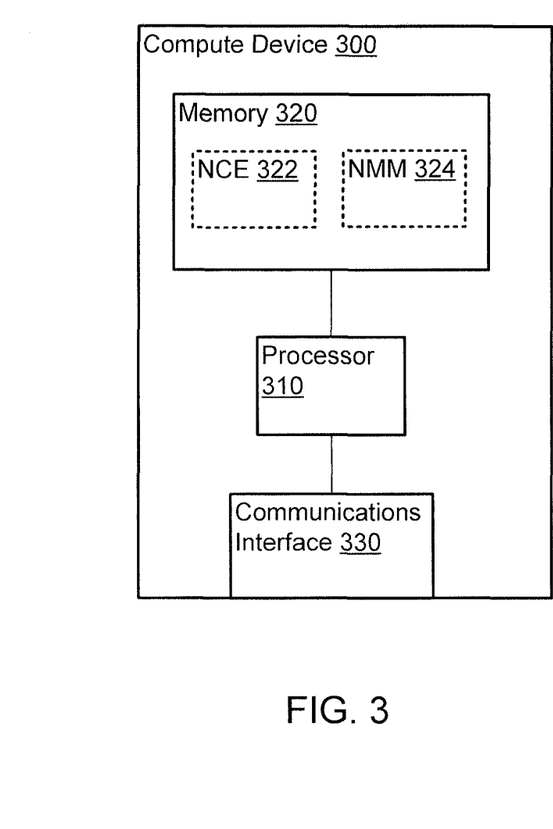
FIG. 3 is a schematic illustration of a compute device of a switch fabric system, according to another embodiment.

FIG. 3 is a schematic illustration of a compute device of a switch fabric system, according to another embodiment. More specifically, FIG. 3 is a system block diagram of a Compute Device 300 substantially similar to the Compute Device 180 described in connection with FIG. 1 above, according to an embodiment. The Compute Device 300 includes a Processor 310, a Memory 320, and a Communications Interface 330. The Processor 310 is operatively coupled to the Memory 320 and the Communications Interface 330. The Compute Device 300 can communicate with other compute devices, peripheral processing devices and/or access switches via the Communications Interface 330.

As illustrated in FIG. 3, the Compute Device 300 can host a Network Control Entity ("NCE") 322 and a Network Management Module 324 similar to the Network Control Entity 191 and the Network Management Module ("NMM") 155, respectively of FIG. 1. In other words, the NCE 322 and the NCE 324 can each be one of a process, application, virtual machine, and/or some other software module (executing in hardware) or a hardware module that is executed at the Compute Device 300. In some embodiments, for example, instructions that implement the NCE 322 and/or the NMM 324 can be stored at the Memory 320 and executed at the Processor 310.

In some embodiments, the Compute Device 300 can be dedicated to hosting the NCE 322 and/or the NMM 324. In other words, the Compute Device 300 can allocate all or substantially all of its computing resources (e.g., processing capacity and memory) to the NCE 322 and/or the NMM 324. In some embodiments, the Compute Device 300 can host other processes, applications, virtual machines, and/or software modules (executing in hardware) in addition to the NCE 322 and/or the NMM 324. For example, the Compute Device 300 can be a general purpose compute device or compute node that is configured to host multiple processes, applications, virtual machines, and/or software modules.

Configuration files for a switch fabric system and multiple resource groups and VLANs of the switch fabric system can be arranged, (stored, located or implemented) at various entities by the control plane, according to another embodiment. More specifically, co-pending U.S. patent application Ser. No. 12/976,191 entitled "Hierarchical Resource Groups For Providing Segregated Management Access to a Distributed Switch," filed on Dec. 22, 2010 and assigned to the assignee of the present application discloses examples of configuration files and arrangements for those files in a switch fabric system such as in FIGS. 4 and 8 and accompanying description therein, the entire disclosure of which is incorporated herein by reference.

In some embodiments, a switch fabric system configuration file can include configuration information associated with a switch fabric system, such as the Switch Fabric System 100 discussed in connection with FIG. 1 above. The switch fabric system configuration information can include, for example, a list, hierarchy and/or topology of one or more VLANs and/or resource groups defined within a switch fabric system. The list, hierarchy and/or topology can optionally include identifier information, logical and/or physical address information, physical location information and/or other information associated with the one or more VLANs and/or resource groups. In some embodiments, the switch fabric system configuration information can include information associated with a total number of network resources included in a switch fabric system. This information can include, for example, a total number of each type of network resource included in the switch fabric system. The switch fabric system configuration information can further include network portion assignment information, port assignment information and peripheral processing device information. The network portion assignment information can include, for example, information sufficient to define the one or more resource groups or VLANs. The port assignment information can include, for example, association of one or more physical ports of the switch fabric system with one or more NCEs. The peripheral processing device information can include, for example, identifier, logical and/or physical address, storage capacity, and/or other information associated with one or more peripheral processing devices included in and/or operatively coupled to the switch fabric system.

In some embodiments the switch fabric system configuration information can further include information regarding network resources or devices or elements, or resource group, or virtual local area networks and in particular their allocation to an entity or individual (e.g., end or customer). The switch fabric system configuration information regarding or relating to a given entity or individual may include information associating logical or virtual address or identifier information with physical address or identifier information of a resource or resource allocated to the entity or individual.

As is clear from co-pending U.S. patent application Ser. No. 12/976,191 entitled "Hierarchical Resource Groups For Providing Segregated Management Access to a Distributed Switch," filed on Dec. 22, 2010 and assigned to the assignee of the present application, the details of which are incorporated herein by reference, various levels of information can be present and encapsulated within the switch fabric and other configuration files to provide a hierarchical arrangement of configuration information associated with a switch fabric system. Thus, reference to a configuration file for a particular hierarchical level within the switch fabric system (such as at the switch fabric or resource group level) might include reference to configuration information associated with each network resource included both at that level within the particular VLAN or resource group, and one or more levels "above". An arrangement relying on inheritance such as described in the co-pending application allows for more efficient updating of configuration information and files, as changes to a particular configuration file for a given VLAN, resource group and/or network resource can be dynamically and/or programmatically propagated (e.g., without the repeated manual input of a network administrator) through to configuration files for another VLAN, resource group and/or network resource included at one or more levels "below" in the switch fabric system hierarchy.

Such a hierarchical arrangement can facilitate the operation of a switch fabric system having a distributed data plane of network elements and a control plane for controlling and monitoring the network elements, the control plane also being distributed across the switch fabric system. Each data plane resource (or element) is associated with one or more control plane resources (or elements).

Figure 4:
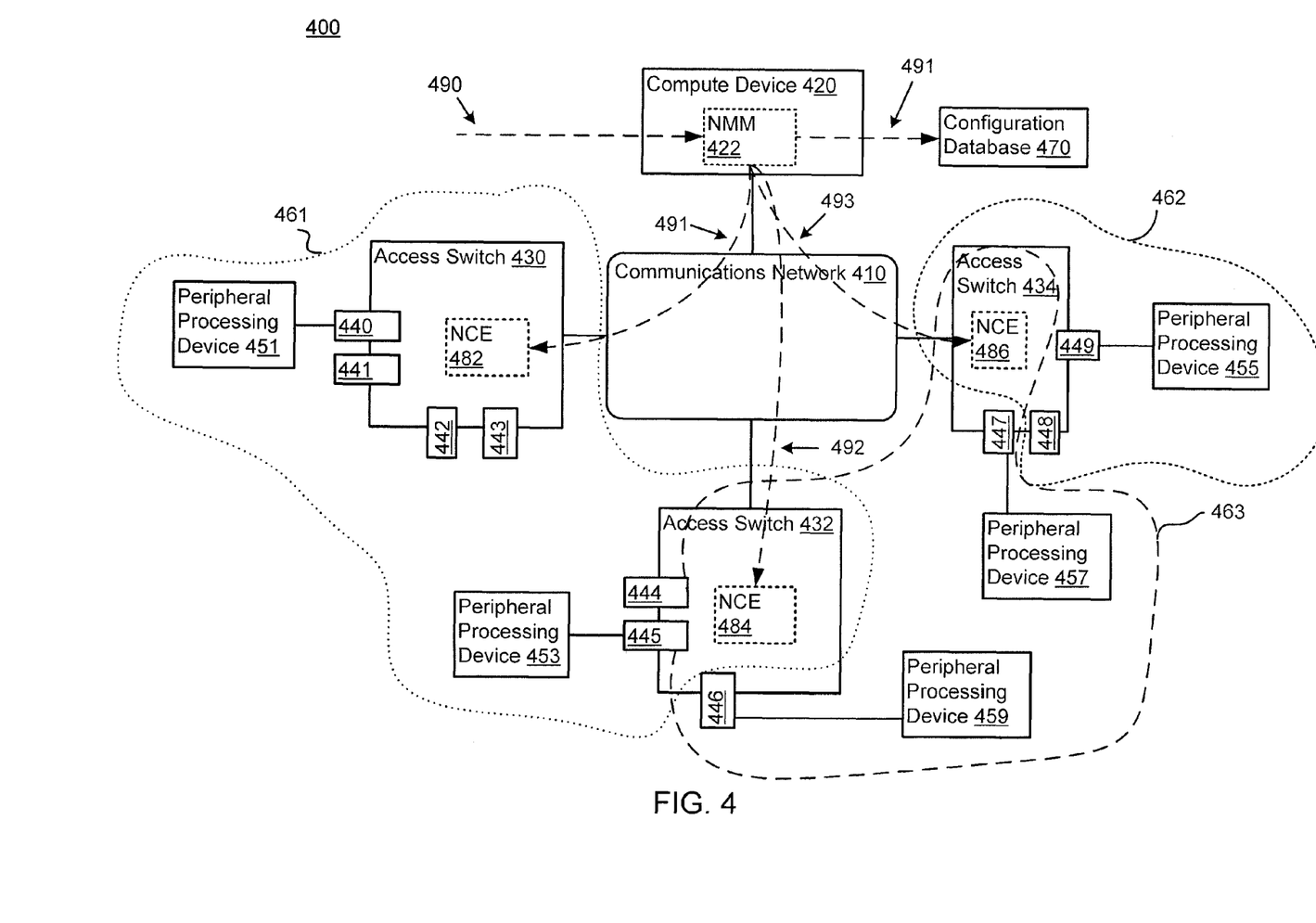
FIG. 4 is a schematic illustration of a switch fabric system that queries for and receives updated status information throughout the switch fabric system, according to another embodiment

FIG. 4 is a schematic illustration of a switch fabric system that receives a request from an entity or individual (e.g., an end user or customer), or an administrator of the switch fabric system, for status information regarding a subset of network resources within the switch fabric system, according to an embodiment. More specifically, FIG. 4 illustrates a Communications Network 410 physically and/or operatively coupled to a Compute Device 420 and Access Switches 430, 432 and 434. The Access Switch 430 is physically and/or operatively coupled to Peripheral Processing Device 451, the Access Switch 432 is physically and/or operatively coupled to a Peripheral Processing Devices 453 and 459, and the Access Switch 434 is physically and/or operatively coupled to a Peripheral Processing Devices 455 and 457. The Compute Device 420 includes a Network Management Module ("NMM") 422 and is coupled to a Configuration Database 470. The Access Switches 430, 432 and 434 include NCEs 482, 484 and 486, and Physical Ports 440-443, 444-546 and 447-449, respectively. The Physical Port 440 is coupled to the Peripheral Processing Device 451, the Physical Port 445 is coupled to the Peripheral Processing Device 453, the Physical Port 446 is coupled to the Peripheral Processing Device 459, the Physical Port 449 is coupled to the Peripheral Processing Device 457, and the Physical Port 449 is coupled to the Peripheral Processing Device 455. The NCE 482 is associated with the Physical Ports 440-443, the NCE 484 is associated with the Physical Ports 444-446 and the NCE 486 is associated with the Physical Ports 447-449.

The Communications Network 410, the Access Switches 430, 432, 434, the NCEs 482, 484, 486, the Physical Ports 440-443, 444-446, 447-449, the Compute Device 420, the Peripheral Processing Devices 430, 432, 434 and the NMM 422 can each be substantially similar to their like-named counterparts discussed in connection with FIG. 1 above.

The Configuration Database 470 can be any combination of hardware and/or software (executing in hardware) configured to receive and store configuration information associated with the Switch Fabric System 400. As shown in FIG. 4, the Configuration Database 470 can be operatively and/or physically coupled to the NMM 422 instantiated at the Compute Device 420. In some embodiments, the Configuration Database 470 can be any relational database, such as an Oracle, Sybase, MySQL, PostgreSQL, SQL Server, or other relational database. In some embodiments, the Configuration Database 470 can include a physical memory, such as one or more hard disk and/or flash memory-based storage memories.

The NMM 422 defines a Resource Group 461 that includes the Access Switch 430 and 432, the Peripheral Processing Devices 451 and 453, the NCEs 482 and 484 and the Physical Ports 440-443 and 444-445. The NMM 422 also defines a Resource Group 462 that includes the Access Switch 434, the Peripheral Processing Device 455, the NCE 486 and the Physical Ports 448-449. The NMM 422 also defines a Resource Group 463 that includes Access Switches 432 and 434, Peripheral Processing Devices 457 and 459, the NCEs 484 and 486 and Physical Ports 446 and 447. The Resource Groups 461 and 462 can be associated with a first entity or individual (e.g., end user or customer) while Resource Group 463 can be associated with a second entity or individual (e.g., end user or customer). Alternatively, the three Resource Groups can be associated with three different individuals or entities or can be all associated with the same entity or individual.

As shown in FIG. 4, the NMM 422 instantiated at the Compute Device 420 receives a Signal 490. The Signal 490 can include a request for information about one or more network resources, resource groups, devices or virtual local area networks including status information about such an element or elements. The request can come, for example, from a network administrator. Alternatively, the request can be generated by an end user or customer and could originate, for example, at a peripheral device associated with a resource group, such as any one of peripheral devices 451-459. In the latter circumstance, the request can be carried by the switch fabric system 400 from an originating device to the NMM 422. The request can seek status information while defining varying levels of resource identification specificity.

The remainder of the detailed description will make reference to a request generated by an end user or customer, but it will be appreciated the same operations and configuration capabilities could be applied to requests originated by or processed at the initiation of a network administrator.

Upon receiving a request, the NMM 422 can use an authorization process to determine whether the request is permissible and/or should be processed. For example, the NMM 422 can confirm that the requester as identified along with the request or in response to an authorization inquiry, has permission to make such a request with reference to previously determined permissions information that can be stored in memory associated with the NMM 422, such as in the configuration database 470. The permissions information could also include information regarding individuals or entities permitted to or designated to receive responses to status information requests.

If the request is valid, that is the requester is authorized and/or the resources to which the request is directed is appropriately identified or related to the requester, the NMM 422 can be configured to access the configuration database 470 to identify physical resources corresponding to resource identifiers associated with the received request where the request can use logical or virtual identifiers to refer to network resources of interest.

In an example, a customer XYZ is associated with Resource Groups 461 and 462 and refers to Resource Group 461 as LAN1 and Resource Group 462 as LAN2. A request from or associated with customer XYZ can seek information about LAN1, or LAN2 or all its LANs or about particular virtually-defined resources within LAN1, LAN2 or both. The NMM 422, using configuration information such as that available from configuration database 470 can use the virtual identifiers provided in connection with the received request to determine physical resources in the Switch Fabric System 400 corresponding to those virtual identifiers.

Continuing this example, where XYZ requests status information regarding ports in LAN1, NMM can use configuration information to identify ports 440, 441, 442, 443, 444 and 445 as physical elements corresponding to the virtually identified resource group. The NMM 422 is configured to generate a query to the identified physical elements via control data flows through the Switch Fabric System 400 within the distributed control plane. Typically, the query will pass down through the hierarchical elements in the switch fabric to the physical elements. However, because some elements may be shared by multiple resource groups, perhaps even by distinct end users, such as for example access switch 432 and NCE 484 which are both used in both Resource Group 461 and Resource Group 463, the status information returned by various physical resources can include information that exceeds the information sought by the request or may be overly inclusive.

In some embodiments, the NMM 422 is configured to receive all of the responses to the query or queries generated and propagated to ascertain the requested information. The NMM 422 can parse or sort the responses to identify or retrieve relevant or pertinent status information. The NMM 422 can aggregate the parsed or sorted information or assemble that information into a request response properly formatted for provisioning to the requesting entity or designated recipient of the status information.

In some other embodiments, the master configuration file described above can thus be programmatically and automatically updated, inasmuch as the master configuration file includes one or more references designed to dynamically include the contents of each configuration files associated with a resource group, VLAN, and/or other network resource included in the Switch Fabric System 400. In this manner, the master configuration file can be maintained in a current and accurate state by the NMM 422 and the NCEs 482, 484 and 486. As such it can be used to dynamically match or associate virtual or logical identifier—based requests with appropriate and accurate physical elements.

As another example, the network management module can receive a request for status information or performance metric information, such as for example a number of packets and/or frames sent within a given period, an average number of packets and/or frames sent, a total and/or average of dropped packets and/or frames associated with a given collection of resources, a resource group, a collection of resource groups, one or more virtual local networks or some combination associated with or assigned to an end user or customer. The network management module can be configured to use information from a configuration file or database to identify resources associated with the end user and can either use such information to generate a query for such status information. Alternatively, the network management module can use information from a configuration file or database to sort through received status information reported by network elements in response to a more generic status query of the switch fabric system, or can use that physical identification information in connection with both generating a query and processing responses to the query.

In some embodiments, a configuration database associated with and/or accessible by a network management module can be, for example, a series of one or more files or records stored at a memory located at the same physical device as the network management module. The configuration database can alternatively be a relational or other database system physically located at a separate device operatively coupled to the device at which the network management module is instantiated.

Again referring to the example of FIG. 4, the NMM 422 can receive a second request for information, this time from the second entity, for information regarding the third Resource Group 463. The NMM 422 would, as described above, identify the physical resources associated with the virtual identifier(s) included with the second request. The NMM 422 then can generate a query to the identified physical resources which, in this instance, encompass Network Control Elements 484 and 486, which are also common to Resource Groups 461 and 462. The status query will yield status information back to the network management module 422 from these shared NCEs. As a result, the returned status information can include data both for the requesting entity and a non-requesting entity. The NMM 422 is configured to aggregate all of the response information it receives and then parse through that aggregated data to identify or select or cull only data that is applicable to the request such that data related to another entity, or to another resource group that is not the subject of the request, is segregated and not included in the response to the request defined by the NMM 422.

Figure 5:
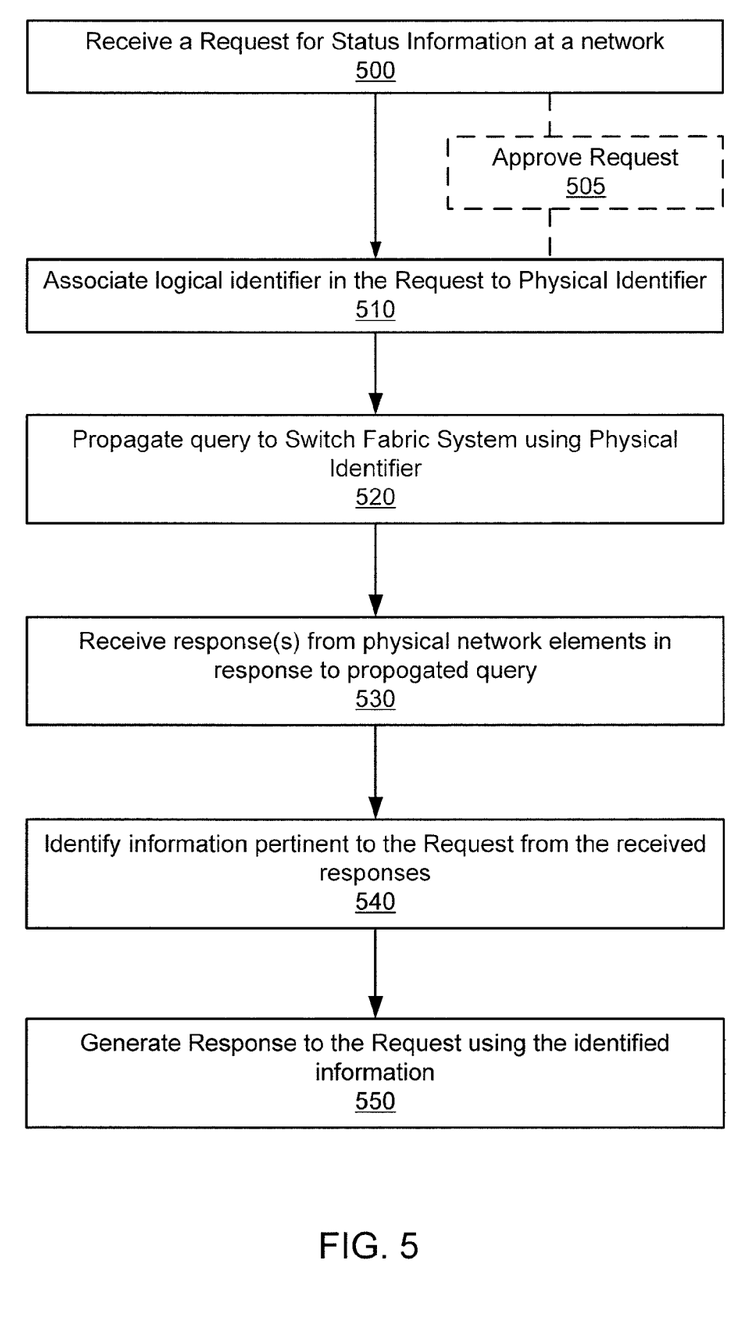
FIG. 5 is a flow chart that illustrates a method of obtaining status information about one or more network resources, according to another embodiment.

FIG. 5 illustrates a flow chart for an example of a process for ascertaining desired status information from a subset of network resources in a Switch Fabric System. According to the flow chart, a network management module can receive a request for status information, at 500. The request can originate with a network administrator or an end user or customer. If the request originates with an end user or customer, the request can be provided to the network management module by a network administrator or can be sent to the network management module via, for example, a peripheral processing device and the switch fabric system.

Optionally, as indicated by the process element shown in dashed lines, the network management module can determine whether to approve the request as represented at 505. The approval process can be used to limit the processing of requests to only those originating from an authorized party. A party can be authorized to request information about all of the resources associated with a particular end user or customer or can be authorized to only request information about a subset of the network resources allocated to a given user or customer. Authorization or approval can be done in a variety of ways including, for example, a database file or look up table having identification information regarding authorized requesters or requesting entities.

If no approval process is undertaken, or if approval is granted, the network management module can be configured to associate a logical identifier in the received request to one or more physical identifiers, at 510. For example, end user XYZ may initiate a request for a virtual local area network for its accounting department. The network management module can translate or identify the XYZ accounting department information that the corresponding physical identifier(s) relate to Resource GroupXincluding specific physical network elements.

Continuing the example, using the physical identifier information, the network management module can generate and propagate a status query to the Switch Fabric System (or a portion of the Switch Fabric System), at 520. An example of a command query for soliciting information is a Unix-based command referred to as "show VLANS" which, when directed to specific network resources, or a specific collection of resources, asks for certain status information from those resources.

Continuing with a description of the process flow, after sending or propagating or scattering a query through the Switch Fabric System, the network management module receives responses from the physical network elements, at 530. As described above the received status information can include a variety of performance metric information depending on the nature of the propagated query. Each group (e.g., resource group and/or VLAN) can provide a result stream. For example a VLAN can supply a result stream. Such a result stream can be in the format of a data descriptor language (DDL) that describes the logical structure of the group or VLAN. The DDL can be any formal language for describing data structures such as an XML schema.

Continuing with an embodiment of a process flow, once the network management module has received the responses, it determines or identifies which of the responses are pertinent to the pending request. In some situations, all of the received information is pertinent. In other situations, the received request pertains to a first plurality or set of network resources. To obtain information about this first plurality or set of network resources, the network management module actually generates and sends a query for a second plurality or set of network resources which encompasses or includes the first plurality or set of network resources but also includes additional resources. In this other situation, the network management module receives status information for all of the resources queried, including those which are not pertinent to the request. Therefore, the network management module is configured to sort through, parse through, or identify the totality of received responses that status information pertinent to the pending request, element 540.

After identifying the pertinent information, the network management module can generate a response to the pending request using the identified information, at 550. The operation of generating can include assembling the identified information into a data format adapted for transmission to a network administrator directly interacting with the network management module. Alternatively, the response to the request can be assembled according to a format facilitating transmission of the response to the requester, or a designate of the requester, via the Switch Fabric System.

In an embodiment, the received result streams are aggregated in accordance with an output descriptor language (ODL), which can be implemented in an XML schema for example. The ODL controls the aggregation and posting or display of the result stream(s) received in response to the queries. For example, each Resource Group or VLAN can be represented including all of the underlying network elements, such as interfaces, with associated metric information such as packet information. The ODL will identify the elements and corresponding data associated with the original request.

The embodiments facilitate satisfying a need to monitor or track characteristics of network resource elements assigned or attributed to a given entity out of a collection of such network resource elements forming a Switch Fabric System where the collection of network resource elements include network resource elements that are specific to a given end user or customer and can include network resource elements shared by two or more end users or customers. In an embodiment, the correlation of logical or virtual identifier information with physical resources and physical identifiers for such physical resources can enable a control plane element to scatter a status information query or queries across the Switch Fabric System, gather responses from a number of physical resources, and then construct a response including status information useful for a requester seeking to track metrics regarding the network resource elements assigned or allocated to them. In an embodiment where network resource elements can be shared by two or more distinct entities, the data for all relevant network resources are gathered and collected data for non-relevant network resource elements are excluded from a response to a request for status where those non-relevant network resource elements are either not associated with the logical structure or entity that is associated with the request.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in foam and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a switch fabric can be included in a single hardware device or module.

What is claimed is:

1. An apparatus, comprising:
a processor;
a memory; and
a network management module configured to be operatively coupled to a switch fabric having a distributed data plane and a distributed control plane and configured to be operatively coupled to a plurality of network resources including a first set of network resources and a second set of network resources each including resource elements distributed across the distributed data plane and each resource element being associated with at least one control plane element of the distributed control plane, the first set of network resources is a subset of the second set of network resources, each network resource from the second set of network resources being configured to send data units;

the network management module configured to receive a request for information regarding the first set of network resources;

the network management module configured to query each resource of the second set of network resources through the distributed control plane based on the received request;

the network management module configured to receive an output descriptor language (ODL) result stream about the second set of network resources in response to the query, the ODL result stream including data about the second set of network resources in a data descriptor language (DDL) format, the ODL result stream including data for a requesting entity and data for at least one non-requesting entity;

the network management module configured to parse the ODL result stream to select data applicable to the first set of network resources and not the second set of network resources, the data about the first set of network resources being for the requesting entity; and the network management module configured to define a response to the request for information regarding the first set of network resources, the response not including the data for the at least one non-requesting entity, the network management module being implemented in at least one of the processor or the memory.

2. The apparatus of claim 1, wherein the network management module is further configured to aggregate the data represented by the DDL to create a result stream represented in an output descriptor language (DDL).

3. The apparatus of claim 1, wherein the first set of network resources includes a plurality of network elements associated with a first Virtual local area network.

4. The apparatus of claim 3, wherein the first virtual local area network includes a plurality of peripheral processing devices, a plurality of ports and at least one access switch.

5. The apparatus of claim 1, wherein the data in the DDL format describes the logical structure of the second set of network resources.

6. An apparatus comprising:
a processor;
a memory; and
a network management module configured to be operatively coupled to a switch fabric and a plurality of network resources including a first set of network resources and a second set of network resources;

the network management module configured to receive a first request for information regarding a first set of network resources, the set of network resources associated with a first logical identifier;

the network management module configured to determine a first physical identifier associated with the first set of network resources, based on the first logical identifier;

the network management module configured to send a query to a subset of network resources from the second set of network resources, the subset associated with said first physical identifier;

the network management module configured to receive a result stream represented in an output descriptor language (ODL) from the subset of network resources from the second set of network resources in response to the query, the received ODL result stream including data about the subset of network resources in a data descriptor language (DDL) format, the received ODL result stream from the subset of network resources including data for a requesting entity and not including data for at least one non-requesting entity; and the network management module configured to define a response to the first request by parsing the ODL result stream to select data alicable to the requesting entity and not applicable to the non-requesting entity, and by using the first logical identifier, and the first physical identifier associated with the subset of network resources from the second set of network resources, the network management module being implemented in at least one of the processor or the memory.

7. The apparatus of claim 6, wherein the network management module is configured to identify a physical resource identifier associated with the first logical identifier.

8. The apparatus of claim 7, further comprising storage configured to associate each virtual resource network element from a plurality of virtual resource network elements with a physical network element from a plurality of physical network elements, the network management module configured to use the storage and first logical identifier associated with a virtual resource network element to identify an associated physical network element.

9. The apparatus of claim 6 wherein the network management module is configured to process the received information by aggregating the data represented by the DDL to define a result stream represented in an output descriptor language (ODL).

10. The apparatus of claim 6, wherein the network management module is further configured to define a response including a plurality of fields of data, each field associated with one of the network resources of the first set of network resources.

11. The apparatus of claim 6, wherein the received information from the first set of network resources includes first data associated with the first logical identifier included in the first set of network resources and second data associated with second set of network associated with a second logical identifier distinct from the first logical resources identifier.

12. An apparatus comprising:
a processor;
a memory; and
a network management module configured to be operatively coupled to a switch fabric and a first plurality of network resources and a second plurality of network resources encompassing the first plurality of network resources, each network resource from the second plurality of network resources being configured to send data units;

the network management module is configured to receive a request for network information from a first entity with which the first plurality of network resources are associated;

the network management module configured to determine using the request, physical identifier information associated with the first plurality of network resources in response to the request;

the network management module configured to send a status inquiry to the second plurality of network resources, based on the physical identifier information;

the network management module configured to receive an output descriptor language (ODL) result stream from each network resource from the second plurality of network resources in response to the status inquiry, the ODL result stream including data about the network resources in a data descriptor language (DDL) format, the ODL result stream including data for a requesting entity and data for at least one non-requesting entity; and the network management module configured to define a response to the request by selecting data in the ODL result stream applicable to the requesting entity and not applicable to the non-requesting entity, the response not including the data for the at least one non-requesting entity, the network management module being implemented in at least one of the processor or the memory.

13. The apparatus of claim 12, wherein the request includes a virtual identifier for network resources associated with the first entity.

14. The apparatus of claim 12, wherein the network management module is configured to identify physical resources associated with the virtual identifier to determine the physical identifier information.

15. The apparatus of claim 12, wherein the received responsive information includes information associated with a network resource which is not a member of the first plurality of network resources.

16. The apparatus of claim 15, wherein the network resources that is not a member of the first plurality of network resources is associated with a second entity distinct from the first entity.

17. The apparatus of claim 16, wherein the response to the request excludes data from the network resource that is not a member of the first plurality of network resources.

* * * * *